(12) United States Patent
Buia et al.

(10) Patent No.: US 7,921,338 B2
(45) Date of Patent: Apr. 5, 2011

(54) SYSTEM AND METHOD FOR REMOTE NETWORK MANAGEMENT OVER UNRELIABLE AND/OR LOW-BANDWIDTH COMMUNICATIONS LINKS

(75) Inventors: Christopher A. Buia, York, PA (US); Daniel Holmes, Madbury, NH (US); Kyle Andrew Pause, Dover, NH (US)

(73) Assignee: Computer Associates Think, Inc., Islandia, NY (US)

( * ) Notice: Subject to any disclaimer, the term of this patent is extended or adjusted under 35 U.S.C. 154(b) by 294 days.

(21) Appl. No.: 12/205,130

(22) Filed: Sep. 5, 2008

(65) Prior Publication Data
US 2010/0064183 A1     Mar. 11, 2010

(51) Int. Cl.
*G06F 11/00*     (2006.01)
(52) U.S. Cl. .......................................................... 714/48
(58) Field of Classification Search .............. 714/4, 6–8, 714/10–13, 25–27, 32, 37–39, 43, 44, 46–48, 714/56
See application file for complete search history.

(56) References Cited

U.S. PATENT DOCUMENTS

| | | | |
|---|---|---|---|
| 7,072,800 B1 * | 7/2006 | Fernandez et al. | 702/186 |
| 7,293,201 B2 * | 11/2007 | Ansari | 714/38 |
| 2004/0136388 A1 * | 7/2004 | Schaff | 370/401 |
| 2005/0027848 A1 * | 2/2005 | Kamenetsky et al. | 709/223 |
| 2008/0204219 A1 * | 8/2008 | Cohn et al. | 340/506 |
| 2009/0013210 A1 * | 1/2009 | McIntosh et al. | 714/4 |
| 2009/0019104 A1 * | 1/2009 | Justen et al. | 709/202 |
| 2009/0037573 A1 * | 2/2009 | Qiu et al. | 709/224 |

* cited by examiner

Primary Examiner — Nadeem Iqbal
(74) Attorney, Agent, or Firm — Michael J. Buchenhorner

(57) ABSTRACT

A system includes a plurality of remote servers deployed in a remote network, a central information management server, and a connector for routing transmissions between the plurality of remote servers and the central information management server.

13 Claims, 5 Drawing Sheets

SYSTEM AND METHOD FOR REMOTE NETWORK MANAGEMENT OVER UNRELIABLE AND/OR LOW-BANDWIDTH COMMUNICATIONS LINKS

CROSS-REFERENCE TO RELATED APPLICATIONS

None.

STATEMENT REGARDING FEDERALLY SPONSORED-RESEARCH OR DEVELOPMENT

None.

INCORPORATION BY REFERENCE OF MATERIAL SUBMITTED ON A COMPACT DISC

None.

FIELD OF THE INVENTION

The invention disclosed broadly relates to the field of information technology (IT), and more particularly relates to the field of management of IT infrastructure.

BACKGROUND OF THE INVENTION

Current fault analysis systems enable users to model and manage their Layer 2 and Layer 3 network for LAN, WAN, wired, wireless, physical and virtual networks—as well as the technologies and IP services provided over them. Root cause analysis and impact analysis technologies pinpoint the precise cause of problems, identify impacted users and recommend corrective actions to improve restoration time.

Numerous military customers use network fault management software to manage remote IT infrastructure in the combat theatre. Communication with remotely-deployed servers can at times be unreliable because it is usually over low-bandwidth satellite connections. There may also be times when management of the equipment is simply not available based on troop tactics.

A military network operations center (NOC) needs to have real-time network topology and status information of all remote IT infrastructure elements. This information is delivered over possibly unreliable, low-bandwidth network connections, and must be able to be re-synced on demand. No current network management products are positioned to provide this type of unique capability.

Therefore, there is a need for a fault management system that overcomes the above-stated shortcomings of the known art.

SUMMARY OF THE INVENTION

Briefly, according to an embodiment of the invention a system includes a remote server deployed in a remote network, a central information management server, and an LMT connector that forwards data from the lightweight mobile server to the central information management machine.

The LMT server communicates with and manages the remote network. The LMT Connector component inside it is configured to connect to the central manager system and forward topology and alarm data. The LMT Manager is a component of the central server with which each LMT connector communicates. Multiple LMT Servers can connect to a single LMT Manager.

BRIEF DESCRIPTION OF THE DRAWINGS

To describe the foregoing and other exemplary purposes, aspects, and advantages, we use the following detailed description of an exemplary embodiment of the invention with reference to the drawings, in which.

Figure 1:
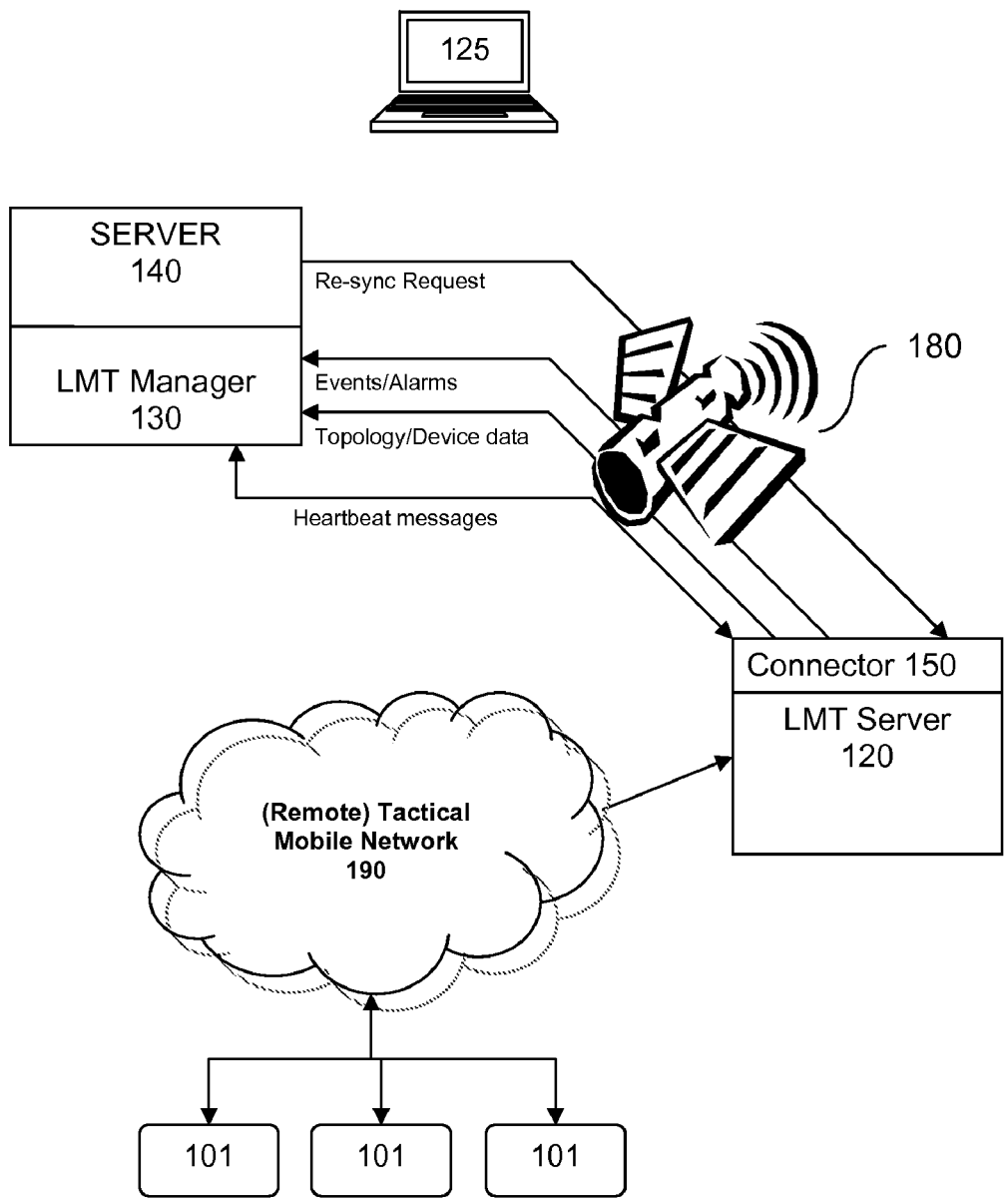
FIG. 1 is a high-level design diagram of a light mobile tactical system, according to an embodiment of the invention.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

We describe a remote network management system that is ideally suited for managing remote networks over unreliable or low-bandwidth connections. The configuration and customization of the system can be staged on a traditional server and imported in order to reduce the footprint of the system and the complexity in using the system.

According to an embodiment of the present invention, communication transmissions such as topology data forwarding and re-sync requests are performed only when the customer requires it, thus reducing the network traffic. Certain critical communications are forwarded in real-time, according to military protocol. These communications include alarm data and heartbeat messages.

The system, as will be described herein, can be advantageously employed with any networked system with remote components communicating with a central station across a link of limited bandwidth. In particular, because of its ability to support mobile units, the system has direct applicability for military clients. Therefore, without loss of generality, we focus our examples on military usage.

Some of the benefits of the present invention are:

a) support of land, sea, air, and space remote tactical environments;

b) support of local combat personnel who may at times be disconnected from the primary networks;

c) ability to share valuable real-time status information enabling situational awareness of a remote IT infrastructure;

d) enable deployment of the necessary tools for proper management of a mobile IT infrastructure to support a mission (fault, performance, configuration);

e) ability to integrate with an IT Management solution capable of scaling to support large command and control networks as well as multiple tactical deployments worldwide;

f) enable support of communication via an unreliable connection or limited bandwidth such as a satellite;

g) easily packaged, deployed, and maintained;

h) allows distribution of key components and device management; and i) supports a scripted installation for multiple deployments.

The remote network management system.

Non-military governmental agencies can benefit from the system also. Many companies in today's emerging countries in Eastern Europe and Africa set up a single large head office in the capital city, and regional sites throughout the rest of the country. The interoffice connections travel through low speed links (64K or 128K). Also, utilities such as telephone companies for those countries offer managed services as well. Again, bandwidth speeds in these countries are not 1 Mb or 10 Mb as in North America or West Europe; they are 64K, 128K, 256K link speeds.

Referring now in specific detail to the drawings, and particularly FIG. 1, there is shown high-level design diagram of a light mobile tactical (LMT) system 100, according to an embodiment of the invention. The LMT system 100 consists of three major components:

a remote server 120—a stand-alone, lightweight system that performs fault tolerant management for the network it manages, including fault management and root cause analysis; it is deployed in a remote location such as the combat theatre/field; and it communicates with a central server 140 through an installed component to deliver network topology and operational alarm status;

an LMT Manager 130—the LMT Manager 130 is configured for receiving various data including alarm data, topology data, re-sync requests, heartbeat messages and the like; and an LMT Connector 150—a component within the remote Server 120; it is the integration piece that forwards data from the remote server 120 to the LMT Manager 130. In one exemplary embodiment of the present invention, the LMT Connector 150 consists of C++ libraries that are linked into the centralized server 140.

Fault tolerance. Each remote server 120 can be configured to connect to a primary and backup server. The central server 140 is also backed up. Once primary and backup central server host names are defined, the remote server 120 automatically starts forwarding topology and alarm data information to the backup machine if the connection to the primary machine goes down. When this happens, a full topology and alarm update is sent to the backup machine and normal alarm forwarding begins. When the connection to the primary machine is restored, the remote server 120 stops sending data to the backup machine, a full topology and alarm update is sent to the primary machine, and normal alarm forwarding resumes. After the remote server 120 stops forwarding data to the backup machine, it is necessary to manually clear any residual alarms and delete any unnecessary models in the backup machine Fault Isolation. If the central server 140 loses contact with a remote server 120, the central server 140 generates a red alarm on the corresponding server model in the user interface of the central server 140. In addition, all components associated with the disconnected remote server 120 will show a suppressed (gray) condition, indicating their current status is not known. The central server 140 does not have management capabilities for components in a suppressed state. When the central Server 140 re-establishes contact with the remote server 120, the red alarm is cleared, and the state of all corresponding components is re-evaluated, in response to a re-sync request. Note that a client 125 with access to the central server 140 is able to view information about all deployed units 101 through the LMT manager 130.

The remote server 120.

The remote server 120 communicates with and manages the remote network 190. The remote server 120 maintains a real-time configuration history for all equipment within its remote network 190. The remote network 190 includes all field units 101 within that network. In the field units 101 are network infrastructure devices, host machines, and the like.

The remote server 120 polls the field units 101 for tactical data. In the alternative, the field units 101 can also send the remote server 120 unsolicited messages (SNMP traps). Once the topology data is synced, the LMT Connector 150 sends alarm data to the LMT Manager 130 in real-time, as soon as the alarm data changes locally.

The remote server 120 can be any computer, information processing system or other programmable electronic device, including a client computer, a server computer, a laptop computer, an embedded controller, a personal digital assistant, and the like. Because the remote server 120 is used in the field, it is preferably a lightweight system. The remote server 120 is interoperably coupled with the remote network 190 via any suitable (wireless (or wired) link such as a Simple Network management Protocol (SNMP) link. The remote server 120 collects network data from the remote network 190 and, through its Connector 150, forwards that data to the centralized Server 140 via a medium such as a satellite link 180 or other low-bandwidth link. Because the medium 180 may be unreliable, as well as low-bandwidth, the remote server 120 is configured to filter the data and forward only certain data, such as heartbeat messages and some alarm data. Topology data and re-sync requests are processed according to a pre-established schedule, or only when requested by a client.

The remote server 120 is configured with the desired topology and alarm forwarding instructions. Once it is set up it is operatively connected with the central server 140. The remote server 120 also acts as a backup support for the LMT Manager 130 for fault tolerance.

The LMT Connector 150.

Figure 2:
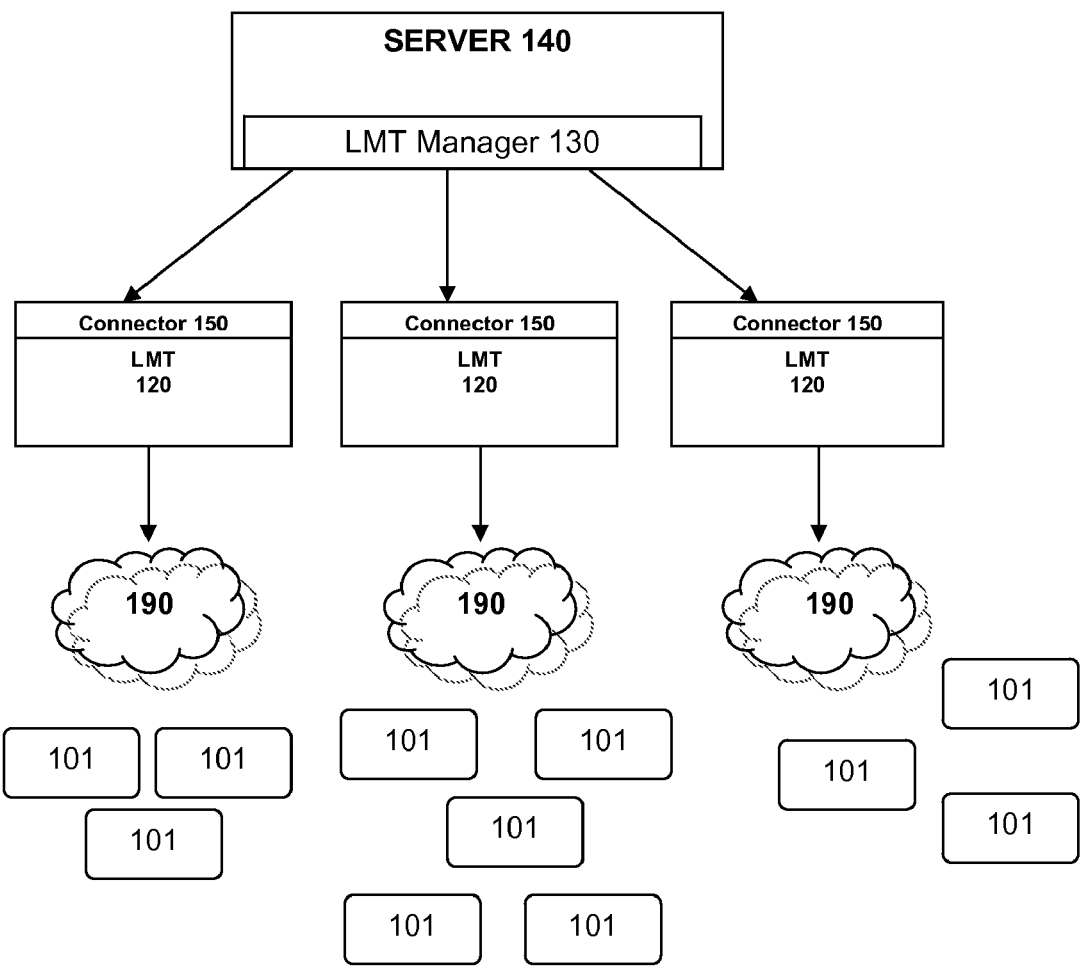
FIG. 2 is high-level diagram illustrating a single LMT Manager integrating with multiple LMT Servers, according to an embodiment of the present invention.

The LMT Connector 150 links the remote server 120 to the LMT Manager 130. It preferably resides within the deployed remote server 120 and is configured to connect to the central LMT Manager 130 and forward topology and alarm data to the LMT Manager 130. The LMT Manager 130 is where all remote topology and alarm data is forwarded. It should ideally support backward compatibility to allow the central server software to be upgraded while remote deployments remain at older versions until tactics allow for upgrading. It can be displayed to the user on a separate device, such as the user's own system 125. Although only one remote server 120 is shown in this illustration, in actual usage multiple remote servers can connect to a single LMT Manager 130. See FIG. 2.

The LMT Connector 150 advertises itself to the central server 140 upon set-up and provides a complete list of the managed assets within the remote network 190 and their status in real time. Additionally, the LMT connector 150 is charged with supplying alarm data in real time. The connector 150 supports various configuration settings allowing various topology and alarm forwarding options.

The Connector 150 provides a representation of all modeling data in the hierarchy of the associated remote server 120, including containers, devices, ports, and applications. The Connector 150 sends the topology information to the LMT Manager 130. The information to be sent and the time intervals for sending the information are decided upon by the user.

The Connector 150 is easily installed and configured in the field, using scripts. A user may easily configure the connector 150 to send data about all device sub-components, interfaces only, and/or applications only. One can also specify the severity of alarms that should be forwarded to the Central Server 140. Additionally, it is possible to filter alarm forwarding, based on alarm probable cause IDs. The probable causes are also forwarded. The Connector 150 only forwards alarms specifically configured for sending to the central Server 140. Any alarm that does not match the alarm forwarding filter will not be forwarded.

If any probable cause codes are listed in the probable cause filter list, then only alarms that match a probable cause ID in that list are forwarded to the central server 140. All others are not forwarded. If the probable cause filter list is empty, then no filtering of alarms based on probable cause code is performed.

To connect to the server 140, the connector 150 must be configured with the name of the central server 140 host machine. Initial topology and alarm data are immediately sent to the central Server 140 once the primary server 140 hostname is set. Subsequent topology updates occur only when contact with the central server 140 is re-established after a disconnect, or with an on-demand topology update.

The Connector 150 does not keep the central server 140 up to date with topology and modeling changes that occur in the remote server 120. The Connector forwards topology data to the central server 140 only when an initial connection is made and when a connection is re-stored; or when it is specifically requested. This is done so that the user can select the best time for the transmission, because such a transmission can consume a lot of network bandwidth on the link. The remote server 120 topology data can be manually updated in the field at any time, and the remote server 120 can be instructed to immediately send the topology data to the Central server 140.

While the remote server 120 polls the remote network elements (field units 101) for various types of data using SNMP, the LMT Connector's only job is to forward alarms and topology data. The topology data (basically, network element inventory) is forwarded by the LMT Connector 150 upon initial connection to the LMT Manager 130 (or re-connection after a disconnect) and the only on-demand by the user. The only other thing the LMT Connector 150 forwards is alarm data. Alarms are specific concepts that allow it to notify users of problems/issues in the network. This could be as a result of polling the network elements for data, or loss of contact, and so forth. The remote server 120 basically checks to see if the alarm passes all of the filters/configurations the user has set up. If so, then the Connector 150 forwards the alarm.

The central server 140.

The centralized Server 140 is any central information management machine that is operable to receive, store, and re-transmit the network data forwarded to it by the Connector 150. It is also operable to display the data in a web browser or other user interface. The Server 140 listens for new connectors supporting multiple units 101. It monitors the health of the connection to the system 100 and supports backward compatibility with the LMT Connector 150.

The LMT Manager 130 stores the network data received at the centralized server 140.

A unique aspect of the invention is its distributed capability. In contrast to traditional distributed networks, the system 100 is able to provide a combined view of the entire network from one point within the network. Monitoring and administrative capabilities for each of the remote servers 120 can also be carried out from the one point. This one point can be a client's system 125. All that is needed is for the client system 125 to establish a connection with the central server 140.

The connector 150 on each remote server 120 is configured to forward alarms to the central server 140. Each connector 150 can be configured, using the remote server's user interface, differently. Alarm data may not be current if the topology data on the central server 140 is not synchronized with the topology data on the remote server 120 or sub-component. In this situation, a topology update is requested to ascertain that both topology and alarm data are current.

When a remote server 120 forwards its topology to a designated central server 140, the devices that constitute the remote network 190 are represented in the central server 140 as "lightweight" models. In this context, "lightweight" refers to the level of visibility. From the central server 140, only minimal essential information is viewable on the field units 101. However, one of those field units 101 viewed locally by operators from the remote server 120 is viewed as a complete model, providing complete local visibility. But in the central server 140, only the essential information about the device is available. This includes the information required to clearly and definitely identify the managed device and its subcomponents. Because the system 100 must be able to operate over low-speed, unreliable connections, it is beneficial to limit the information load. The remote server 120, therefore, only communicates the essential information needed to provide the central server 140 with a real-time view of its managed topology and operational alarm state. The field units 101 can be routers, switches, firewalls, workstations, and the like. It should be noted that topology re-sync request can come from the central server 140 as well as any of the remote servers 120.

Figure 3:
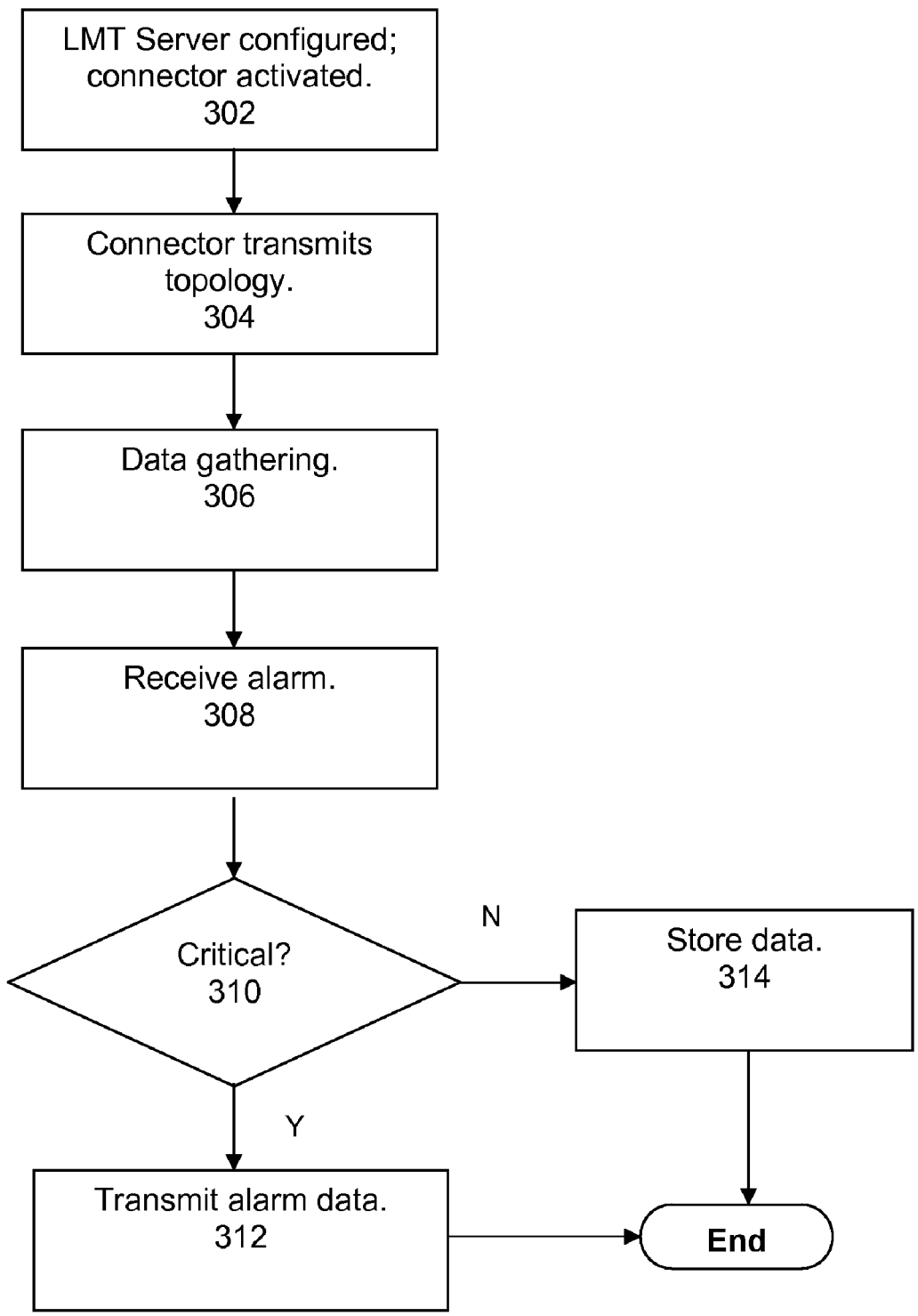
FIG. 3 is a flowchart of a method according to an embodiment of the invention.

Referring to FIG. 3, there is illustrated a flow chart illustrating an information processing method 300 according to an embodiment of the invention. The method begins at step 302 wherein a remote server 120 is configured and set up in the field. The connector 150 is also activated. The remote server 120 is responsible for managing the field units 101 in its network 190. Once the connector 150 is activated, in step 304 the connector 150 transmits an up-to-date topology of the network 190. It also begins sending heartbeat messages at predetermined intervals.

On an on-going basis, as represented in step 306, the remote server 120 gathers data from the remote network 190. This data is generally field data gathered by the field units 101. The server 120 routinely checks the field units 101 to determine their status. These checks may be simple pings, followed by a waiting interval; or more elaborate status inquiries.

In step 308 the local server 120 becomes aware of a fault situation in one of the field units 101 under its control. It records and classifies the information according to a pre-determined alarm and probable cause list. Next, in step 310 the remote server 120 must determine if the alarm situation should be transmitted to the central server 140 as a critical event. In order to make this determination, the server 120 needs to apply a set of filters to the alarm data. It attempts to match the fault condition to the probable cause list. If the fault condition matches one on the probable cause list, it then checks the alarm severity associated with that probable cause.

According to one embodiment of the present invention, if the alarm data is determined to be critical (a high severity rating), it is transmitted by the connector 150 to the central server 140 in step 312. It should be noted that the alarm severity levels to be transmitted are pre-established. Once the alarm data is transmitted, it is displayed as an alert on the LMT manager 130. When the remote server 120 forwards an alarm to the central server 140, it includes two important parts of information: the title of the alarm, and the actual text of the event that caused the alarm to be generated. Due to tactical deployment and geographical restrictions, the software version installed and running on the remote server 120 may be slightly different than that which is running on the central server 140. This means that the two machines may not have the same fault detection intelligence installed. The title of the alarm may not be the same on both servers. This is why the actual text of the event is also transmitted.

Figure 4:
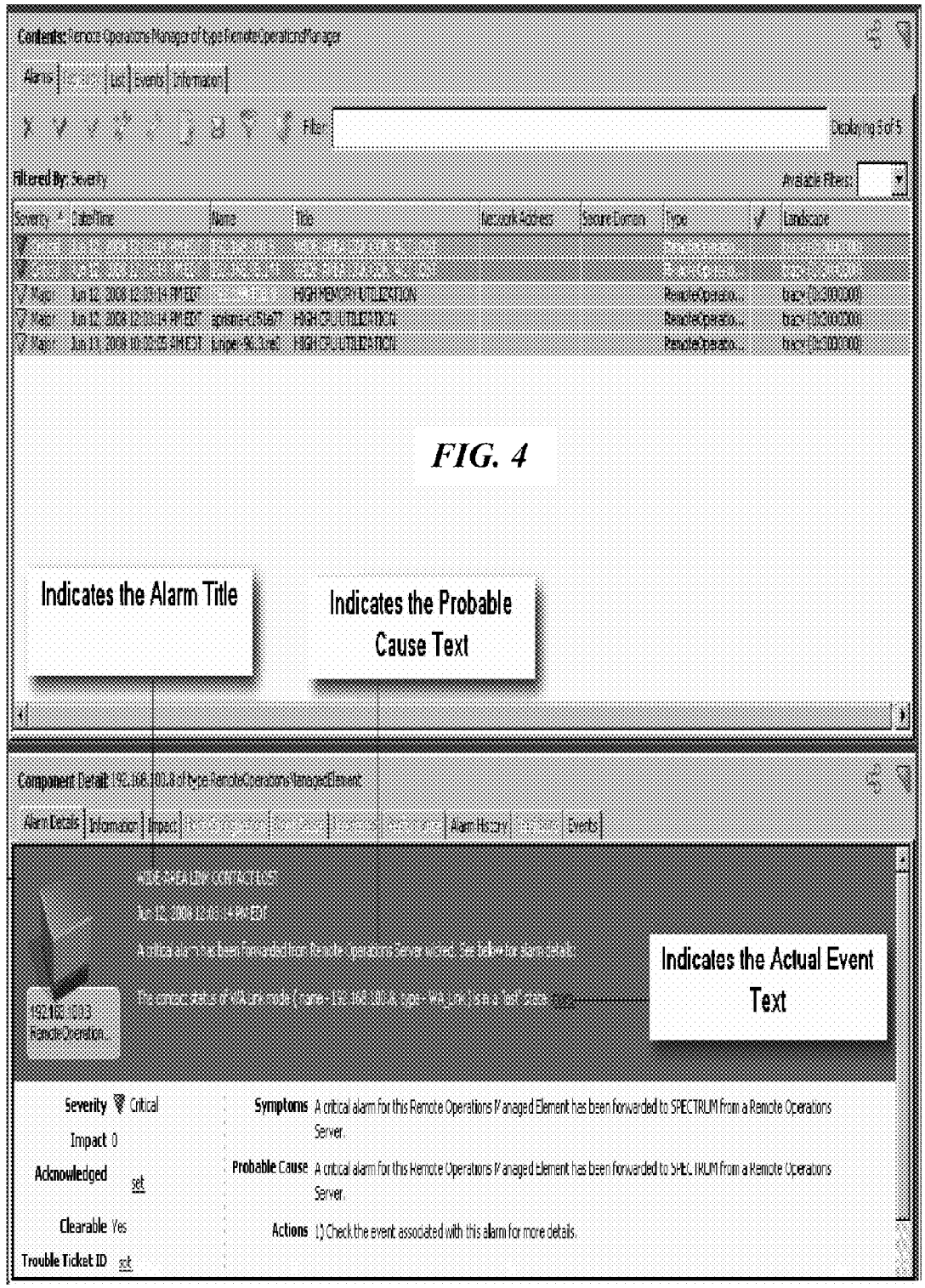
FIG. 4 is a screenshot of an exemplary alarm reporting interface, according to an embodiment of the present invention.
Figure 5:
FIG. 5 is a screenshot of an exemplary topology reporting interface, according to an embodiment of the present invention.

Referring to FIG. 4 there is shown an exemplary report showing how the alarm data is displayed by the central server 140.

However, if the alarm data does not conform to any of the filters, then in step 314 the local server 120 stores the data, but does not forward it to the central server 140. This stored data may be viewed by a local user through a user interface of the local server 120. All of the relevant information regarding the fault information is viewable by any of the other systems within or coupled with the remote network 190.

We describe an exemplary situation following the method of FIG. 3. Assume a Cisco Router suddenly becomes inoperable. The remote server 120 is monitoring the status of the equipment and sees the fault. It responds with an alarm message to the central server 140. A client monitoring the central server 140 immediately sees the alarm situation.

Because the central server 140 has backup configurations for all deployed equipment, the client is able to procure a router, load the last saved configuration onto the router and airlift the new router to the mobile unit 101. Once the new router is installed, the remote server 120 updates its configuration data to reflect the new router.

In another scenario, it is the connector 150 that fails. The system 100 is configured so that heartbeat data is periodically transmitted from the connector 150 to the LMT manager 130. The LMT manager 130 detects the absence of a heartbeat and generates an alarm message on the central server 140.

According to another embodiment of the invention, a computer readable medium, such as a CDROM can include program instructions for operating a programmable computer according to the invention. What has been shown and discussed is a highly-simplified depiction of a programmable computer apparatus. Those skilled in the art will appreciate that other low-level components and connections are required in any practical application of a computer apparatus.

Therefore, while there has been described what is presently considered to be the preferred embodiment, it will understood by those skilled in the art that other modifications can be made within the spirit of the invention. The above descriptions of embodiments are not intended to be exhaustive or limiting in scope. The embodiments, as described, were chosen in order to explain the principles of the invention, show its practical application, and enable those with ordinary skill in the art to understand how to make and use the invention. It should be understood that the invention is not limited to the embodiments described above, but rather should be interpreted within the full meaning and scope of the appended claims.

We claim:

1. A system for remote network management, the system comprising:
   a central information management server comprising:
   a component for communicating with a plurality of remote servers over a data transmission medium;
   a component for storing transmissions received from the plurality of remote servers;
   a user interface for presenting to a user a partial model of a plurality of field units that are monitored by the central information management server;
   and at least one remote network comprising:
   the plurality of field units;
   the plurality of remote servers for managing the plurality of field units, wherein each one of the plurality of remote servers is configured for:
   polling the plurality of field units for tactical data;
   receiving an alarm indicating an occurrence of a fault event at least one of the plurality of field units managed by said at least one remote server;
   and determining whether the fault event should be transmitted to the central information management server by applying a test, wherein applying said test comprises steps of:
   comparing the fault event to a plurality of alarm probable causes that are categorized as critical and non-critical; and
   determining if the fault event is considered critical, if the fault event matches at least one of the plurality of alarm probable causes that is categorized as critical;
   wherein the at least one remote server comprises:
   a user interface for presenting a complete model of the plurality of field units under the purview of the at least one remote server;
   and a network component configured for:
   announcing itself to the central management information server upon set-up, and providing a complete list of managed assets within the at least one remote network and their status in real-time;
   forwarding heartbeat messages at predetermined intervals to the central information management server;
   forwarding information about the fault event in real-time to the central information management server only if the fault event if it is determined that the fault event should be transmitted;
   and forwarding topology data and addressing re-synchronization requests only under a specific condition.

2. The system of claim 1 wherein the data transmission medium comprises a low bandwidth medium.

3. The system of claim 1 wherein the plurality of field units comprises at least one selected from a group consisting of: a router, a switch, a firewall, and a workstation.

4. The system of claim 1 wherein the specific condition comprises initial activation of the remote server.

5. The system of claim 1 wherein the specific condition comprises a reconnection following a lost connection.

6. The system of claim 1 wherein the specific condition comprises a user request.

7. The system of claim 1 further comprising a fault tolerance safeguard comprising a backup server for the at least one remote server.

8. The system of claim 1 wherein the user interface is a web browser operatively coupled with the central information management system.

9. A method comprising:
   at a remote server, receiving an alarm indicating an occurrence of a fault event at a remote unit managed by said remote server, said remote server being configured to monitor a plurality of field units and to forward alarms to a central network management server;
   determining whether the fault event is critical by applying a test, wherein applying said test comprises steps of:
   comparing the fault event to a plurality of alarm probable causes that are categorized as critical and non-critical; and
   determining if the fault event is considered critical, if the fault event matches at least one of the plurality of alarm probable causes that is categorized as critical;
   forwarding information about the fault event in real-time to the central network manager server if the fault event is determined to be critical;
   forwarding heartbeat messages in real-time to the central network manager server; and
   responding to re-synchronization requests and topology updates.

10. The method of claim 9 wherein the forwarding step comprises:

forwarding a title of the fault event and actual text of the fault event that caused the alarm to be generated.

11. The method of claim 9 wherein the forwarding step is performed by a connector that is coupled with the remote server.

12. A computer readable storage medium comprising program instructions for causing a processor to perform steps of:
   monitoring a plurality of field units;
   receiving an alarm indicating an occurrence of a fault event at one of the plurality of field units;
   determining whether the fault event is critical by applying a test;
   forwarding information about the fault event in real-time to a central network manager server if the fault event is determined to be critical, wherein said forwarding comprises forwarding a title of the fault event and actual text of the fault event that caused the alarm to be generated;
   and forwarding heartbeat messages in real-time to the central network manager server;
   and responding to re-synchronization requests and topology updates.

13. The computer readable storage medium of claim 12 wherein the program instructions for determining whether the fault event is critical further comprises program instructions for
   comparing the fault event to a plurality of alarm probable causes that are categorized as critical and non-critical; and
   determining if the fault event is considered critical, if the fault event matches at least one of the plurality of alarm probable causes that is categorized as critical.

* * * * *